United States Patent
Banks et al.

(10) Patent No.: US 11,008,873 B2
(45) Date of Patent: May 18, 2021

(54) TURBINE BLADE TIP WALL COOLING

(71) Applicant: UNITED TECHNOLOGIES CORPORATION, Farmington, CT (US)

(72) Inventors: Anton G. Banks, Manchester, CT (US); Lane Mikal Thornton, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 66 days.

(21) Appl. No.: 16/267,664

(22) Filed: Feb. 5, 2019

(65) Prior Publication Data

US 2020/0248565 A1    Aug. 6, 2020

(51) Int. Cl.
  F01D 5/18    (2006.01)

(52) U.S. Cl.
  CPC ........ *F01D 5/187* (2013.01); *F05D 2230/211* (2013.01); *F05D 2240/307* (2013.01); *F05D 2250/11* (2013.01); *F05D 2250/292* (2013.01); *F05D 2260/20* (2013.01); *F05D 2260/941* (2013.01)

(58) Field of Classification Search
  CPC ............... F01D 5/187; F05D 2240/307; F05D 2250/11; F05D 2250/292
  See application file for complete search history.

(56) References Cited

U.S. PATENT DOCUMENTS

| | | | |
|---|---|---|---|
| 4,142,824 A | 3/1979 | Anderson | |
| 4,487,550 A | 12/1984 | Horvath et al. | |
| 5,660,523 A | 8/1997 | Lee | |
| 6,283,708 B1* | 9/2001 | Zelesky | F01D 5/189 416/97 R |
| 6,837,687 B2 | 1/2005 | Lee et al. | |
| 7,473,073 B1* | 1/2009 | Liang | F01D 5/20 415/173.5 |
| 7,510,376 B2* | 3/2009 | Lee | F01D 11/08 416/97 R |
| 7,922,451 B1 | 4/2011 | Liang | |
| 9,085,988 B2* | 7/2015 | Kwon | F01D 5/20 |
| 9,816,389 B2* | 11/2017 | Malak | F01D 5/187 |
| 2008/0131285 A1 | 6/2008 | Albert et al. | |
| 2017/0089206 A1* | 3/2017 | Quach | F01D 5/187 |
| 2018/0216471 A1 | 8/2018 | Rathay | |
| 2018/0347375 A1 | 12/2018 | Beyer | |

FOREIGN PATENT DOCUMENTS

EP    1543896    6/2005

OTHER PUBLICATIONS

EP Search Report for EP Application No. 20155478 dated Jun. 8, 2020.

* cited by examiner

*Primary Examiner* — J. Todd Newton
*Assistant Examiner* — Christopher R Legendre
(74) *Attorney, Agent, or Firm* — Carlson, Gaskey & Olds, P.C.

(57) ABSTRACT

A gas turbine engine blade according to an example of the present disclosure includes a blade including internal walls defining a blade cooling passage and a tip section at a radially outer end of the blade. The tip section includes a pocket protruding into the tip section from a radially outermost end of the tip section to a pocket floor. The blade further includes a pocket wall defined between the pocket floor and the radially outermost end of the tip section and including a tapered wall cooling passage.

15 Claims, 6 Drawing Sheets

TURBINE BLADE TIP WALL COOLING

BACKGROUND

Gas turbine engines, such as those used on commercial aircraft, utilize a compressor to compress air, a combustor to mix the compressed air with a fuel and ignite the mixture, and a turbine across which the resultant combustion products are expanded. Expansion of the combustion products drives the turbine section to rotate, which in turn drives rotation of a shaft connecting the compressor to the turbine.

Included within each of the turbine sections are multiple rotor blades arranged circumferentially about an axis defined by the engine, and protruding radially outward from an inner diameter of the engine flowpath. Each rotor blade is designed to facilitate driving rotation of the turbine shaft. The efficiency by which the expansion of combustion products is converted to rotation within the turbine is partially related to temperature of air within the flowpath and a radially outward tip clearance between a tip of each rotor and an outer diameter of the flowpath.

SUMMARY OF THE INVENTION

A gas turbine engine blade according to an example of the present disclosure includes a blade including internal walls defining a blade cooling passage and a tip section at a radially outer end of the blade. The tip section includes a pocket protruding into the tip section from a radially outermost end of the tip section to a pocket floor. The blade further includes a pocket wall defined between the pocket floor and the radially outermost end of the tip section and including a tapered wall cooling passage.

In a further embodiment of any of the foregoing embodiments, the tapered wall cooling passage extends from the blade cooling passage to the radially outermost end of the tip section.

In a further embodiment of any of the foregoing embodiments, the tapered wall cooling passage branches from a single supply hole at the blade cooling passage to multiple discharge holes.

In a further embodiment of any of the foregoing embodiments, the tapered wall cooling passage has an approximately triangular shape with a base at the radially outermost end of the tip section.

In a further embodiment of any of the foregoing embodiments, the wall includes a second wall cooling passage having an approximately cylindrical shape.

In a further embodiment of any of the foregoing embodiments, the tapered wall cooling passage further includes pins extending across the wall cooling passage.

In a further embodiment of any of the foregoing embodiments, the pins extend from a side of the tapered wall cooling passage nearer an exterior of the blade to a side of the wall cooling passage nearer the pocket.

In a further embodiment of any of the foregoing embodiments, at least one of the pins is flush with the radially outermost end of the tip section.

In a further embodiment of any of the foregoing embodiments, the pocket wall includes a second cooling passage extending from the blade cooling passage to an opening in the pocket wall located between the pocket floor and the radially outermost end of the tip section.

In a further embodiment of any of the foregoing embodiments, the pocket wall further includes a third cooling passage that extends from the blade cooling passage to the radially outermost end of the tip section.

In a further embodiment of any of the foregoing embodiments, the pocket wall opening is located in the pocket.

In a further embodiment of any of the foregoing embodiments, the pocket wall opening is configured to direct cooling air flow to the pocket floor.

A gas turbine engine according to an example of the present disclosure includes a compressor section, a combustor fluidly connected to the compressor section, a turbine section fluidly connected to the combustor, and a plurality of rotors disposed in the turbine section. Each of the rotors includes a plurality of turbine blades. At least one of the turbine blades includes a blade including internal walls defining a blade cooling passage and a tip section at a radially outer end of the blade. The tip includes a pocket protruding into the tip section from a radially outermost end of the tip section to a pocket floor. A pocket wall is defined between the pocket floor and the radially outermost end of the tip section and includes a wall cooling passage that extends from the blade cooling passage to an opening in the pocket wall located between the pocket floor and the radially outermost end of the tip section.

In a further embodiment of any of the foregoing embodiments, the opening is within the pocket.

In a further embodiment of any of the foregoing embodiments, the opening in the pocket wall is configured to discharge cooling air to convectively cool the pocket floor during operation of the gas turbine engine.

In a further embodiment of any of the foregoing embodiments, the pocket wall further includes a second wall cooling passage that extends from the blade cooling passage to the radially outermost end of the tip section.

In a further embodiment of any of the foregoing embodiments, the second wall cooling passage is tapered.

A method of manufacturing a gas turbine engine blade by investment casting, comprising according to an example of the present disclosure includes arranging a first investment casting core portion corresponding to a blade cooling passage in a mold, arranging a second investment casting core portion corresponding to a tip pocket radially outward of the first investment casting core portion within the mold, and arranging third investment casting core portion in the mold. Such that the third investment casting core portion extends in a radial direction from the first investment casting core portion past a radially innermost surface of the second investment casting core portion.

In a further embodiment of any of the foregoing embodiments, the third investment casting core portion is formed from refractory metal and has a first end contacting the first investment casting core portion and a second end contacting the second investment casting core portion.

In a further embodiment of any of the foregoing embodiments, the first investment casting core portion and third investment casting core portion as a unitary body.

These and other features of the present invention can be best understood from the following specification and drawings, the following of which is a brief description.

DETAILED DESCRIPTION OF AN EMBODIMENT

Figure 1:
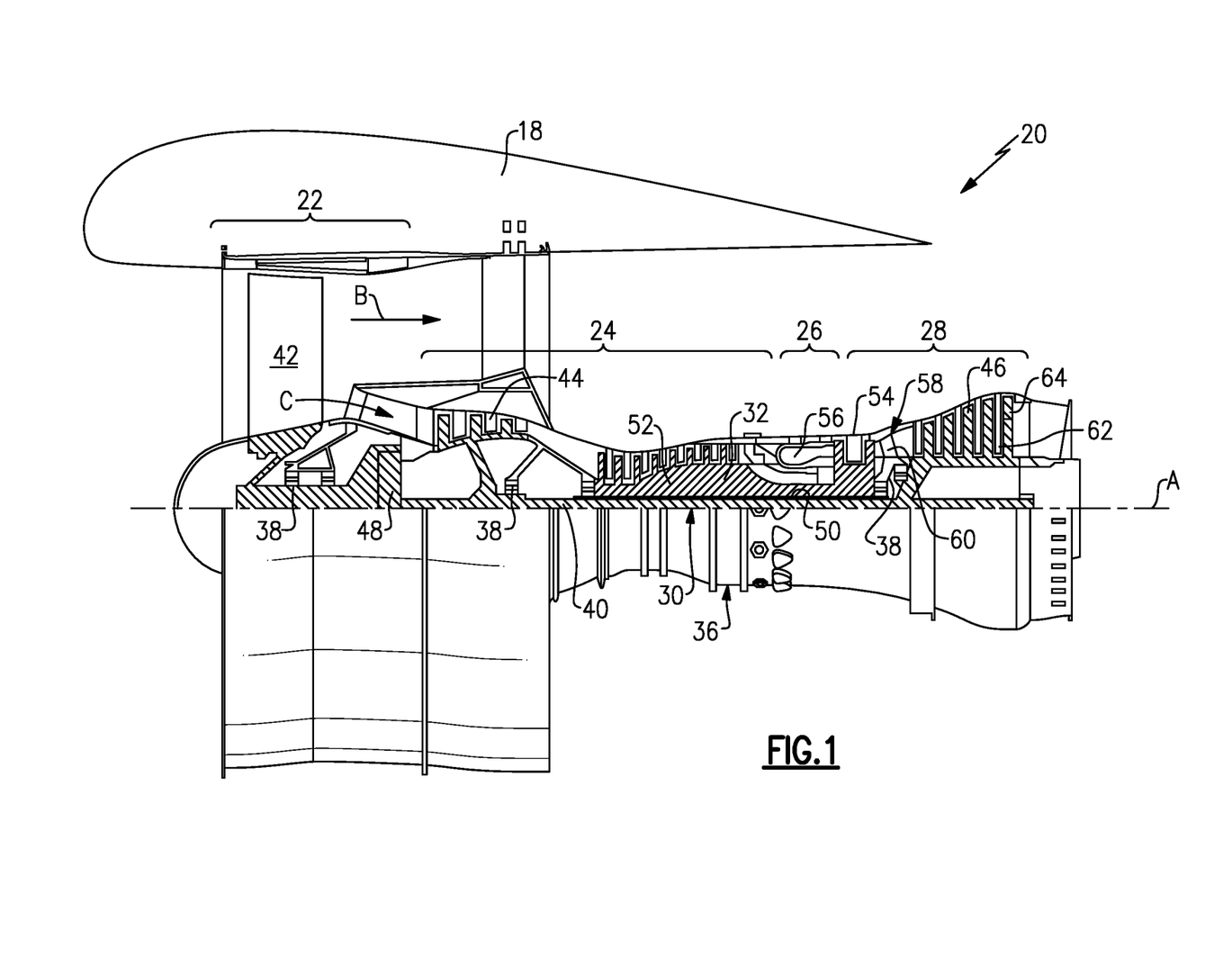
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/s).

Within the turbine section are multiple turbine rotors, with each rotor having multiple rotor blades arranged circumferentially in a ring and protruding radially outward from an inner diameter of the turbine section flowpath. Each rotor is paired with a corresponding stator section to form a turbine stage. Each rotor blade spans a majority of the primary flowpath.

In order to prevent thermal mechanical fatigue (TMF) based cracking in the tip of the rotor blade, the amount of material in the tip of the blade is minimized as much as possible. The minimization of material is achieved, at least in part, by the creation of a squealer pocket that protrudes into the tip of the rotor blade.

Figure 2:
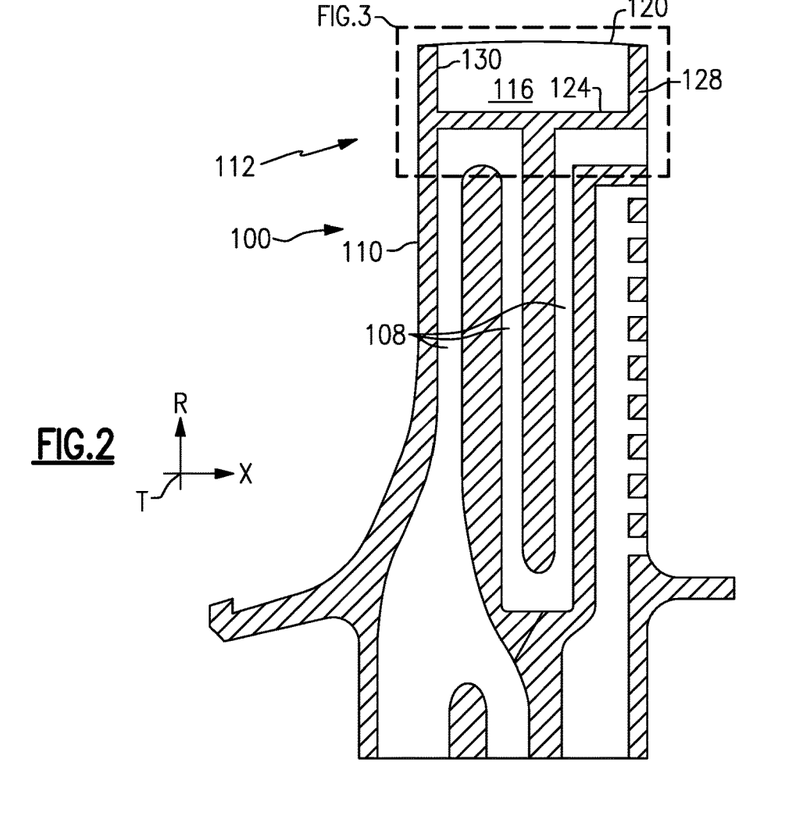
FIG. 2 is a sectional view of a gas turbine engine blade.

With continued reference to FIG. 1, FIG. 2 schematically illustrates an exemplary rotor or turbine blade 100. The blade 100 is illustrated with respect to an axial direction X that would be parallel to the engine central axis A when the blade 100 is installed, a radial direction R that extends perpendicular to the axial direction X and along a length of the blade 100, and a tangential circumferential direction T that is perpendicular to the axial direction X and the radial direction R.

The blade 100 includes a blade cooling passage 108, an exterior surface 110, and a tip section 112 at a radially outer end of the blade 100. The tip section 112 includes a pocket 116 protruding into the tip section 112 from a radially outermost end 120 of the tip section 112 to a pocket floor 124. A pocket wall 128 is defined between the pocket floor 124 and radially outermost end 120 of the tip section 112. In the illustrated embodiment, the pocket wall 128 bounds the pocket 116 and is flush with the exterior surface 110 of the blade 100.

Figure 3:
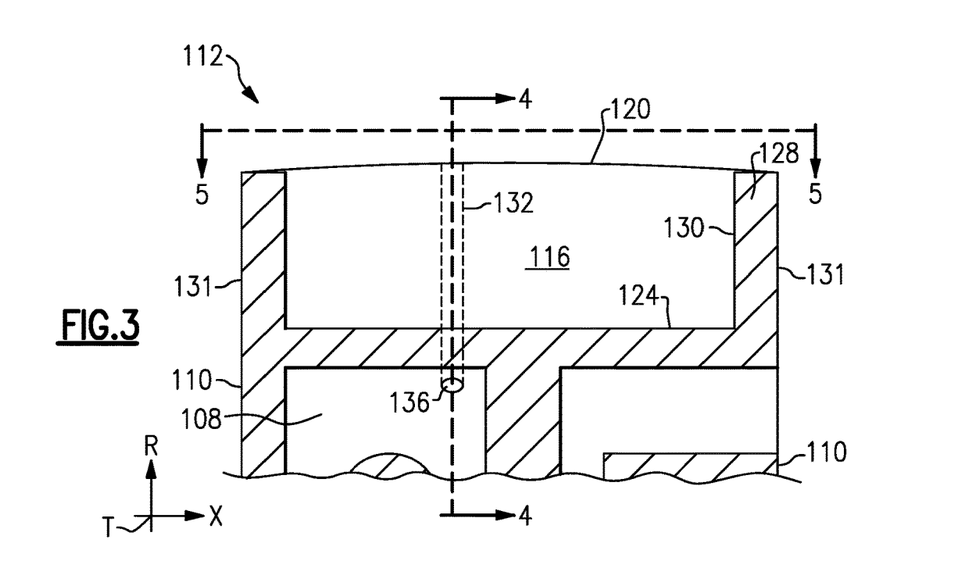
FIG. 3 is a close view of a tip section of the gas turbine engine blade.

Turning to FIG. 3, the pocket wall 128 has an inner side 130 within the pocket 116 and an outer side 131 flush with the exterior surface 110 of the blade 100. A full length wall cooling passage 132 connects to the blade cooling passage 108 at a supply opening 136 and extends through the pocket wall 128 to the radially outermost end 120 of the tip section 112.

Figure 4:
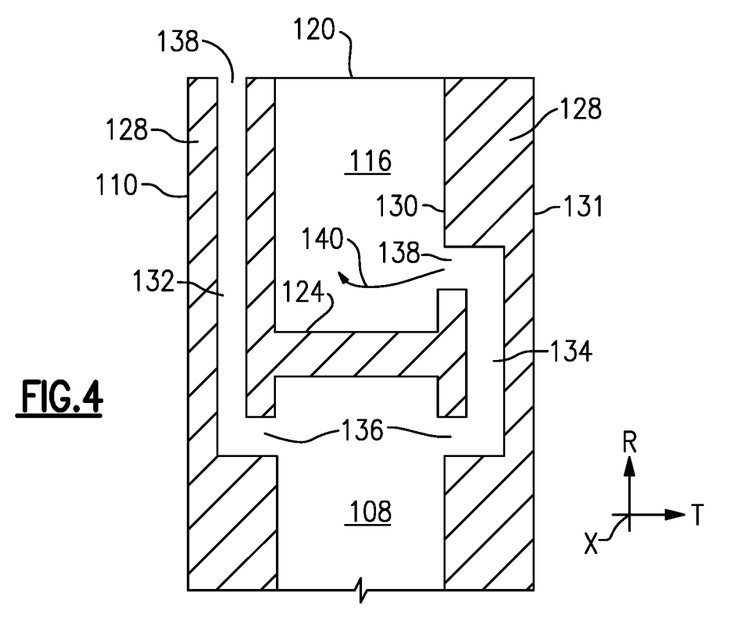
FIG. 4 is a view along line 4-4 of FIG. 3.

FIG. 4 shows a cross-section of the full length wall cooling passage 132 and a partial length wall cooling passage 134. The full length wall cooling passage 132 extends from the supply opening 136 in the blade cooling passage 108 to a discharge opening 138 at the radially outermost end 120 of the tip section 112. The partial length wall cooling passage 134 extends from another supply opening 136 in the blade cooling passage 108 to another discharge opening 138 located within the cooling pocket 116 and on the inner side 130 of the pocket wall 128 between the pocket floor 124 and the radially outermost end 120 of the tip section 112. In the illustrated embodiment, the discharge opening 138 of the partial length wall cooling passage 134 is configured to direct cooling air 140 to convectively cool, or "scrub," the pocket floor 124 when the engine is in operation.

Figure 5:
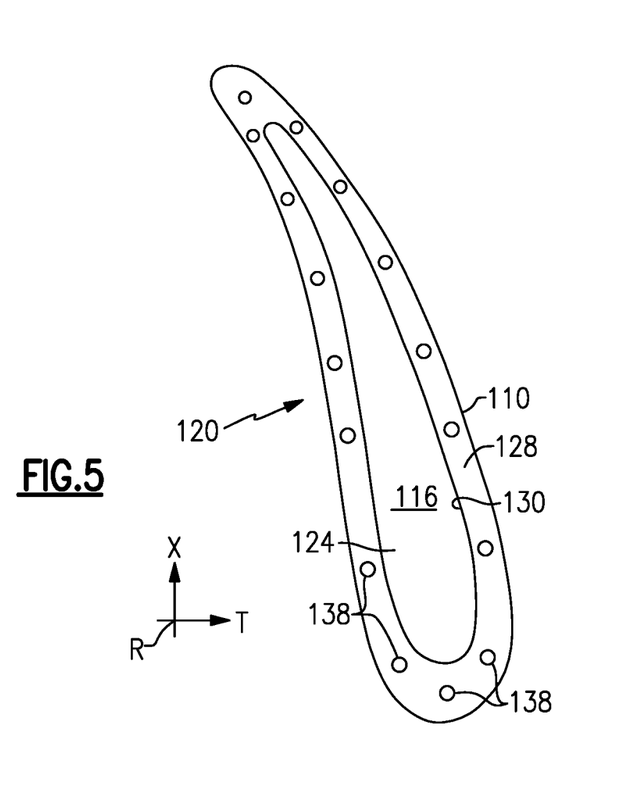
FIG. 5 is a view along line 5-5 of FIG. 3.

According to the embodiment illustrated in FIG. 5, the blade 100 has multiple discharge openings 138 distributed around the pocket wall 128 at the radially outermost end 120 of the tip section 112, each corresponding to one of multiple full length wall cooling passages 132.

Figure 6:
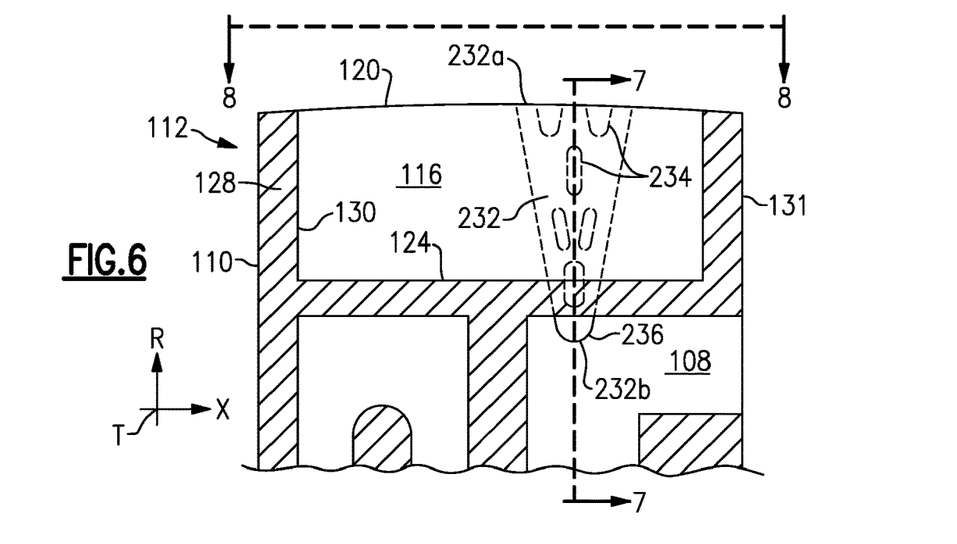
FIG. 6 is a close view of a tip section according to another embodiment.

FIG. 6 illustrates a tip section 112 of a blade 100 with a tapered wall cooling passage 232. The tapered wall cooling passage 134 expands from an apex 232b at a supply opening 236 in the blade cooling passage 108 to a base 232a at the radially outermost end 120 of the tip section 112. The tapered wall cooling passage 232 further includes convective cooling pins 234. Some of the pins 234 are spaced from both the base 232a and apex 232b, and some pins 234 are flush with the radially outermost end 120 of the tip section 112.

Figure 7:
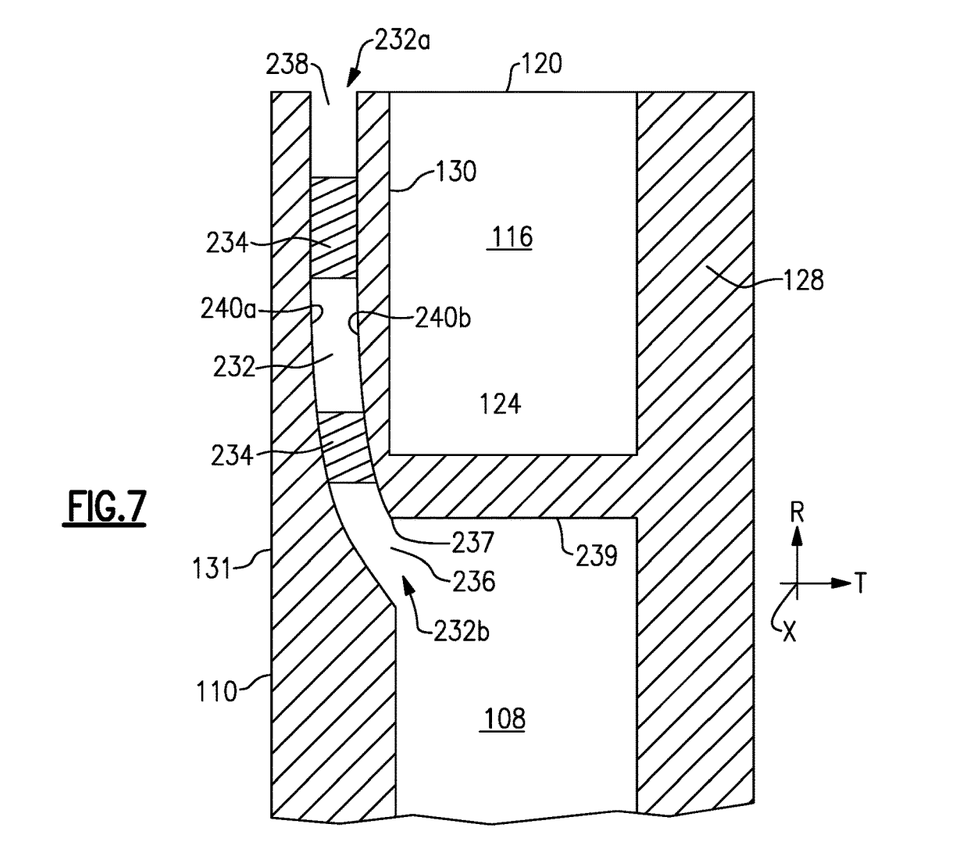
FIG. 7 is a view along line 7-7 of FIG. 6.

As shown in FIG. 7, the pins 234 extend from an outer passage side 240a, nearer the outer side 131 of the pocket wall 128 and exterior surface 110 of the blade 100, to an inner passage side 240b, nearer the inner side 130 of the pocket wall 128 and the pocket 116. The supply opening 236 meets the blade cooling passage 108 at a convex corner 237 such that a radially outermost surface 239 of the blade cooling passage 108 adjoins the inner passage side 240b. The adjoining of the radially outermost surface 239 with the inner passage side 240b enables an investment casting core corresponding to both the blade cooling passage 108 and the tapered wall cooling passage 232 to be cast as a unitary body. For a blade 100 produced by using the unitary body as an investment casting core, pins 234 could be produced separately and installed in the tapered wall cooling passage 232 after the blade 100 is cast. Though the foregoing investment casting process is explained with regard to the tapered wall cooling passage, it can be adapted to wall cooling passages 132, 134, 232 of other shapes.

Figure 8:
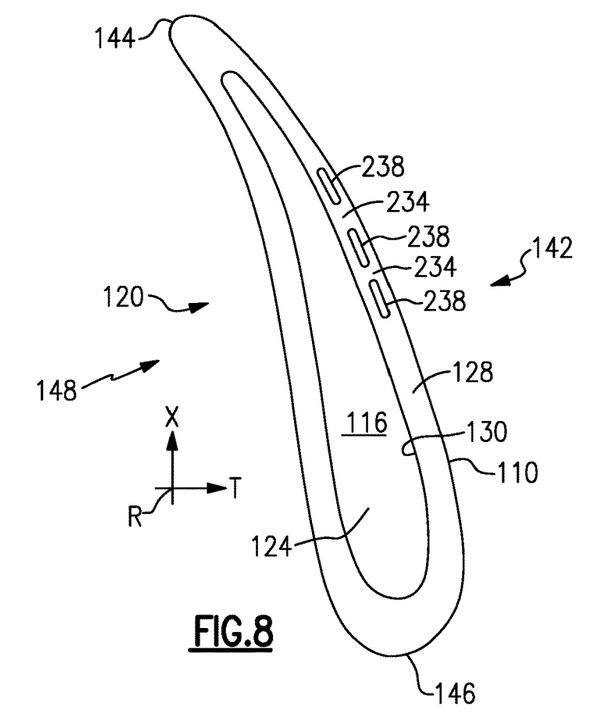
FIG. 8 is a view along line 8-8 of FIG. 6.

FIG. 8 shows that the pocket wall 128 at the radially outermost end 120 of the tip section 112 has multiple discharge openings 238 fed by the tapered wall cooling passage 232. Also visible are pins 234 that are flush with the pocket wall 128 at the radially outermost end 120 of the tip portion 112. Referring back to FIG. 6, with continued reference to FIG. 8, the pins 234 effectively cause the tapered cooling passage to branch and to discharge cooling air from multiple discharge openings 238.

A number and distribution of wall cooling passages 132, 134, 232 can be chosen according to design needs of a given application. Further, a blade 100 can include any combination of differently shaped wall cooling passages 132, 134, 232 to suit the application. For example, a blade 100 may contain a number of full length or tapering cooling passages 132, 232 to adequately cool an entire height of a pocket wall 128 and a number of partial length wall cooling passages 134 to adequately cool a pocket floor 124. In some embodiments, the height of the pocket wall 128 or depth of the pocket 116 can thus be varied within certain limits without necessitating a change to the blade 100.

In some applications, for example, a highest heat load is on a pressure side 142 at or near a trailing edge 144 of the blade 100, while a leading edge 146 and suction side 148 will be subject to lower heat loads. Accordingly, some embodiments include at least one of a greatest number and density of wall cooling passages 132, 134, 232 on the pressure side 142 at or near the trailing edge 144. At least one of the number and density of wall cooling passages 132, 134, 232 is greater on the pressure side 142 than on the suction side 148. Further, at least one of the number and density of wall cooling passages 132, 134, 232 increases from the leading edge 146 to the trailing edge 144. Here, "density of wall cooling passages" refers to a total cooling capacity of the wall cooling passages per unit area of the pocket wall 128 in a given portion of the pocket wall 128. For example, a tapered wall cooling passage 232 according to the illustrated embodiment provides greater cooling capacity than a full length wall cooling passage 132, and thus contributes more to the density of wall cooling passages 132, 134, 232. A full length wall cooling passage 132 according to the illustrated embodiment, in turn, provides greater cooling capacity and therefore contributes more to the density of cooling passages than a partial length wall cooling passage 134.

Figure 9:
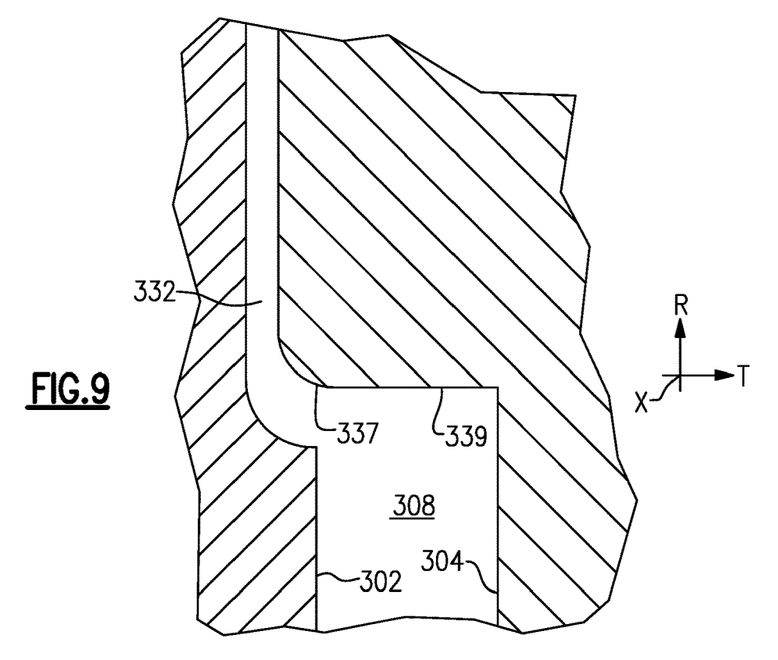
FIG. 9 illustrates a die for an investment casting core.

FIG. 9 shows an exemplary die 302, 304 for producing an investment casting core corresponding to one or more cooling passages. The die includes a first die portion 302 and second die portion 304 that meet to define a blade cooling passage negative space 308. In the illustrated embodiment, a wall cooling passage negative space 332 is connected to the blade cooling passage negative space 308. The connected negative spaces 308, 332 meet at a convex corner 337 adjoining a surface of the second die portion 304 that defines a radially outermost extremity 339 of the blade cooling passage negative space 308. As such, the die portions 302, 304 can be pulled apart after the negative spaces 308, 332 are filled with a solidified core material, such as ceramic.

Figure 10:
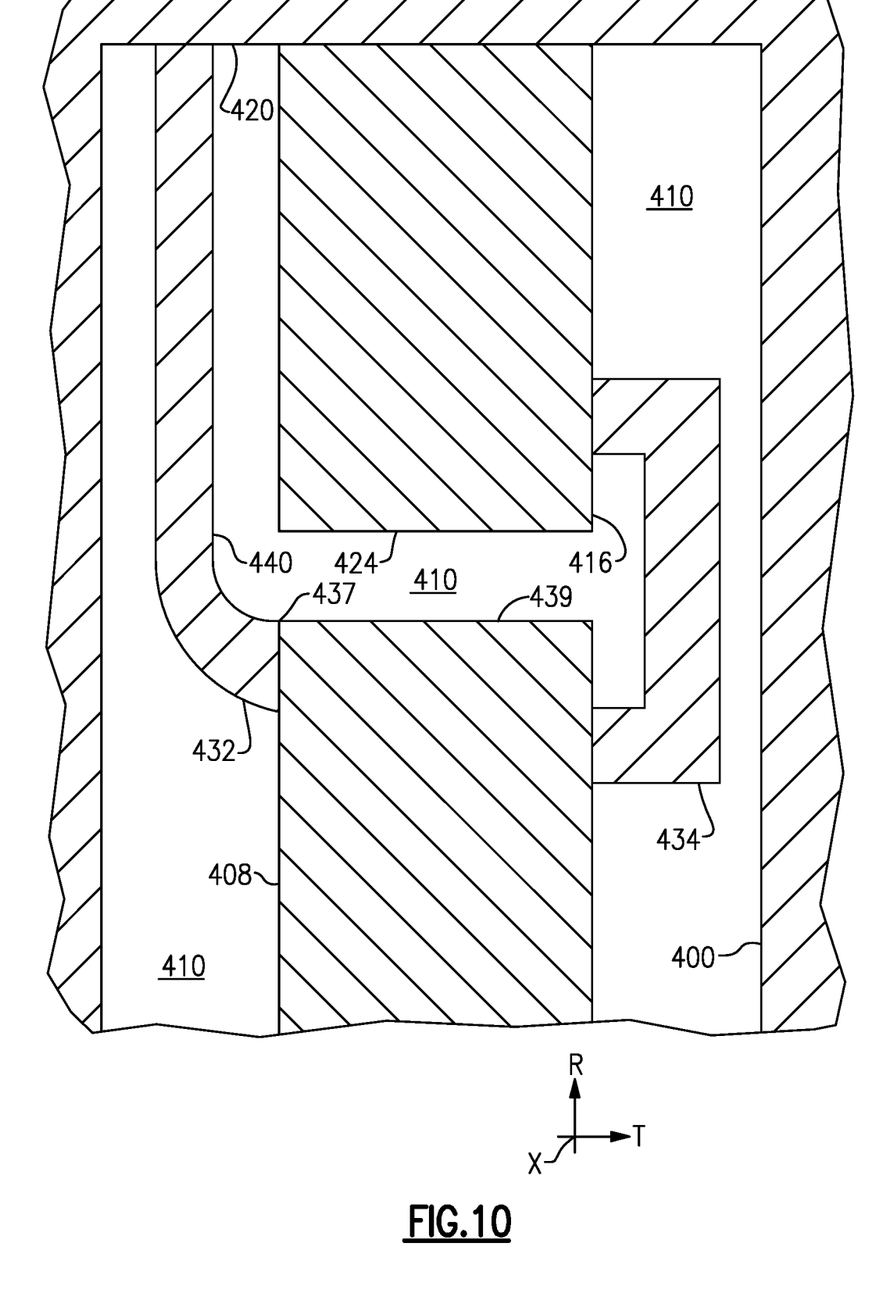
FIG. 10 illustrates a mold for a turbine blade.

FIG. 10 shows exemplary investment casting cores arranged in an investment mold 400. The mold 400 defines a negative space 410 corresponding to features of a turbine blade 100. A pocket core 416 is arranged in the negative space 410 radially outward of a blade cooling passage core 408. A full length wall cooling passage core 432 and partial length wall cooling passage core 434 extend radially from the blade cooling passage core 408 past a radially innermost surface 426 of the pocket core 424.

The full length wall cooling passage core 432 extends from the blade cooling passage core 408 to a radially outermost surface 420 of the mold 400. An inner side 440 of the full length wall cooling passage core 432 adjoins a radially outermost surface 439 of the blade cooling passage core 408 at a concave corner 437, such that the full length wall cooling passage core 432 and blade cooling passage core 408 can be cast as a unitary body with the die 302, 304.

The partial length wall cooling passage core 434 extends from the blade cooling passage core 408 to a side of the pocket core 416 other than the radially innermost surface 426 of the pocket core 416. In the illustrated embodiment, the partial length wall cooling passage core 434 extends to an axial face of the pocket core 416. In another example, the partial length wall cooling passage core 434 extends to a circumferential face of the pocket core 416. The partial length wall cooling passage core 434 can be, for example, a piece of refractory metal formed to a desired shape.

According to certain embodiments, wall cooling passage cores 432 cast as a unitary body with the blade cooling passage core 408 correspond to wall cooling passages 132, 134, 232 on the pressure side 142 of an end product blade 100, while refractory metal cores will correspond to wall cooling passages 132, 134, 232 on a suction side 148 of the end product blade 100. Casting pressure side 142 wall cooling passage cores 232 as a unitary body with the blade cooling passage core 408 is an efficient way to provide wall cooling passages 132, 232 of relatively high cooling capacity on the pressure side 142 of the end product blade 100.

The negative space 410 can be filled with a material for a turbine blade 100. When the material solidifies, the cores 408, 416, 432, 434 can be leached out or otherwise removed to leave a turbine blade 100 having a blade cooling passage 108, pocket 116, and one or more wall cooling passages 132, 134, 232.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine blade comprising:
   a blade cooling passage defined by internal walls of the blade;
   a tip section at a radially outer end of the blade and including a pocket protruding into the tip section from a radially outermost end of the tip section to a pocket floor; and
   a pocket wall defined between the pocket floor and the radially outermost end of the tip section and including a tapered wall cooling passage, wherein the tapered wall cooling passage extends from the blade cooling passage to an outlet in the radially outermost end of the tip section, the outlet arranged between an exterior blade surface and the pocket, and wherein the tapered wall cooling passage has pins extending across the tapered wall cooling passage, wherein the tapered wall cooling passage has an approximately triangular shape with a base at the radially outermost end of the tip section and an apex at a supply hole at the blade cooling passage.

2. The gas turbine engine blade of claim 1, wherein the tapered wall cooling passage branches from a single supply hole at the blade cooling passage to multiple discharge holes.

3. The gas turbine engine blade of claim 2, wherein the pocket wall has multiple wall cooling passages and a density of the multiple discharge holes is greater on a pressure side of the blade than a suction side.

4. The gas turbine engine blade of claim 3, wherein the density of the multiple discharge holes increases from a leading edge of the blade toward a trailing edge.

5. The gas turbine engine blade of claim 1, wherein the pocket wall includes a second wall cooling passage having an approximately cylindrical shape.

6. The gas turbine engine blade of claim 1, wherein the pins extend from a side of the tapered wall cooling passage nearer an exterior of the blade to a side of the tapered wall cooling passage nearer the pocket.

7. The gas turbine engine blade of claim 1, wherein at least one of the pins is flush with the radially outermost end of the tip section.

8. The gas turbine engine blade of claim 1, wherein the pocket wall includes a second cooling passage extending from the blade cooling passage to an opening in the pocket wall located between the pocket floor and the radially outermost end of the tip section.

9. The gas turbine engine blade of claim 8, wherein the pocket wall further includes a third wall cooling passage that extends from the blade cooling passage to the radially outermost end of the tip section.

10. The gas turbine engine blade of claim 8, wherein the opening is located in the pocket.

11. The gas turbine engine blade of claim 10, wherein the opening is configured to direct cooling air flow to the pocket floor.

12. The gas turbine engine blade of claim 1, wherein at least one of the pins is spaced from the base of the approximately triangular shape.

13. The gas turbine engine blade of claim 1, wherein a radially outermost surface of the blade cooling passage meets an inner passage side of the tapered wall cooling passage at a convex corner.

14. A gas turbine engine comprising:
   a compressor section,
   a combustor fluidly connected to the compressor section;
   a turbine section fluidly connected to the combustor; and
   a plurality of rotors disposed in the turbine section, each of the rotors having a plurality of turbine blades, at least one of the turbine blades comprising:
      a blade cooling passage defined by internal walls of the at least one turbine blade;
      a tip section at a radially outer end of the at least one turbine blade, and a pocket protruding into the tip section from a radially outermost end of the tip section to a pocket floor; and
      a pocket wall defined between the pocket floor and the radially outermost end of the tip section and including a wall cooling passage that extends from the blade cooling passage to an opening in the pocket wall located between the pocket floor and the radially outermost end of the tip section, and wherein the pocket wall further includes a second wall cooling passage that is tapered and that extends from the blade cooling passage to an outlet in the radially outermost end of the tip section, the outlet arranged between an exterior blade surface and the pocket, and wherein the second wall cooling passage has pines extending across the second wall cooling passage, the second wall cooling passage has an approximately triangular shape with a base at the radially outermost end of the tip section and an apex at a supply hole at the blade cooling passage.

15. The gas turbine engine of claim 14, wherein the opening in the pocket wall is configured to discharge cooling air to convectively cool the pocket floor during operation of the gas turbine engine.

* * * * *